McGERRY ALLMAYER.
ELECTRIC HEATING DEVICE.
APPLICATION FILED OCT. 9, 1911.

1,134,661.

Patented Apr. 6, 1915.

2 SHEETS—SHEET 1.

McGERRY ALLMAYER.
ELECTRIC HEATING DEVICE.
APPLICATION FILED OCT. 9, 1911.

1,134,661.

Patented Apr. 6, 1915.
2 SHEETS—SHEET 2.

UNITED STATES PATENT OFFICE.

McGERRY ALLMAYER, OF CHICAGO, ILLINOIS.

ELECTRIC HEATING DEVICE.

1,134,661. Specification of Letters Patent. Patented Apr. 6, 1915.

Application filed October 9, 1911. Serial No. 653,496.

*To all whom it may concern:*

Be it known that I, McGerry Allmayer, a citizen of the United States, residing at Chicago, in the county of Cook and State of Illinois, have invented certain new and useful Improvements in Electric Heating Devices, of which the following is a specification.

My invention relates to improvements in coffee and tea pots and has especial reference to devices of this character, wherein the liquid is heated by means thermically responsive to the passage of an electric current.

One of the objects of my invention is to provide a device of the character described, which is simple in construction, efficient in operation and durable in service.

Figure 1:
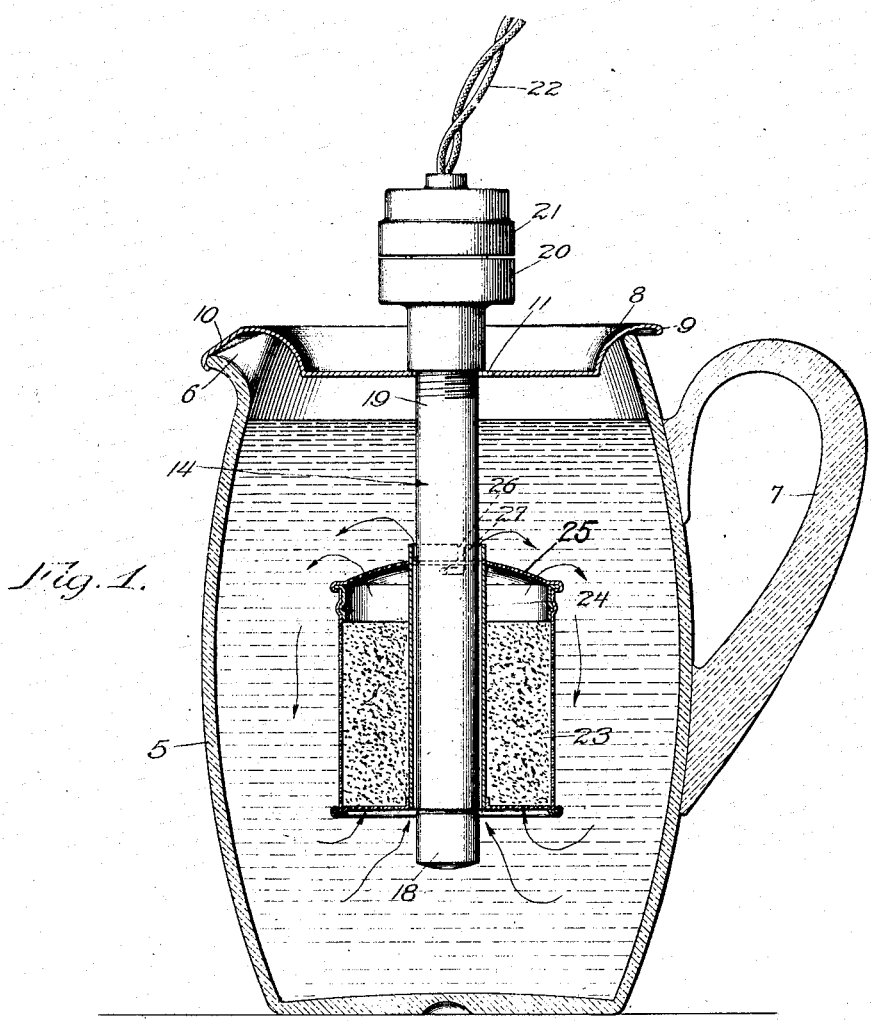
Figure 2:
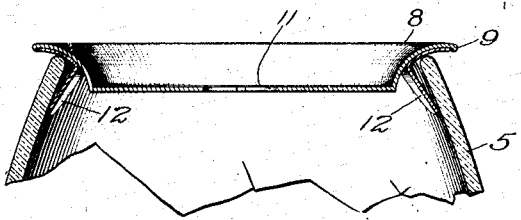
Figure 3:
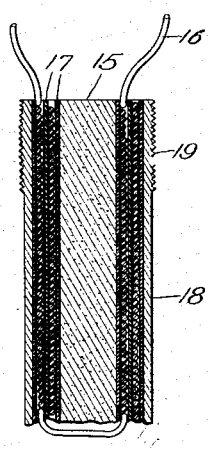
Figure 4:
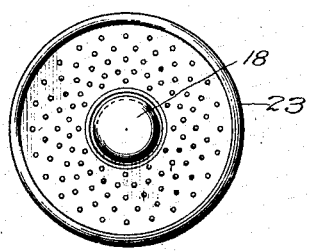

Other and further objects of my invention will become readily apparent to persons skilled in the art from a consideration of the following description taken in conjunction with the drawings, wherein;

Figure 1 is a vertical, central section of the assembled device. Fig. 2 is a broken away portion in section, of the upper portion of the containing vessel showing the manner of retaining the closure thereof in place. Fig. 3 is a central vertical section of a portion of the heating element; Fig. 4 is a view looking toward the bottom of the heating element with the coffee containing cup in place.

In all of the views the same reference characters are employed to indicate similar parts.

The liquid containing receptacle, 5, may be made of glass, with a lip 6, and in the shape of a pitcher with a handle 7, or it may be a simpler container made of metal or other liquid holding material, although for several reasons I prefer to use a glass receptacle.

A cover or closure, 8, is preferably made of sheet metal, and is flanged as at 9, to properly lie within the opening of the vessel 5. It is provided with a lip covering part, 10, to completely overlie and close the opening provided by the lip 6. It is centrally perforated as at 11 for insertion of the heating element. Tongues 12 are out-turned against the inner sides of the receptacle 5 to prevent the closure 8 from falling from place. The tongues are inserted, one after the other, through the opening provided by the lip 6 and the closure is rotated as the tongues are entered.

The heating element 14 is provided with a central core 15, of some refractory, heat-resisting material, such as burnt clay, kaolin, or the like. It is wound with one layer of heating wire 16, then the layer is covered with a pasty compound 17, of heat-resisting and electrically insulating nature, which dries upon application of heat, and another layer of wire is wound thereupon and more of the insulation is applied in alternating layers until sufficient wire has been thus superposed upon the support 15 to produce the desired temperature consistent with the difference of potential of the circuit upon which the device is to be used. Finally a layer of insulating material should be applied over the last layer of wire, and the device thus made should be slipped into a closed-end covering jacket, or tube 18, which is, preferably, screw threaded at its upper or open end, as at 19. The terminals of the wire 16, are connected to an attaching socket, 20, and the latter is screwed on to the end of the tube 18. A detachable plug 21, connected to a flexible cord 22, makes electrical contact with the terminals to which the wire 16 is connected in the socket 20, and thus the heating element is connected with a circuit leading to a source of electric energy.

A coffee holding cup, 23, is made of perforate sheet metal and is, preferably, provided with a central imperforate tube 24, somewhat larger in diameter than the heating element 14, to leave therebetween sufficient room for movement of liquid, which movement is superinduced by the heat evolved from the heater 14. The upper end of the tube 24 projects above the cover 25, and is provided on opposite sides with bayonet joint supporting slots 26—26, that have locking engagement with radially projecting pins 27 from the tube 18. By this means the coffee containing cup is securely supported on the heating element and from which it may be quickly removed.

When the surrounding water is heated by the heater 14, the water in contact with the surface thereof rises rapidly and water farther removed therefrom as rapidly falls, thus causing a rapid circulation of water through the contents of the cup 23 and as rapidly extracting the soluble contents.

While I have herein described a single embodiment of my invention, it is obvious that changes therein may be made without departing from the spirit and scope of the appended claims.

What I claim is:

1. In a heating device, the combination with a utensil of a relatively long, electrically heating, inclosed element, and a food containing cup surrounding a portion thereof and supported in said utensil.

2. In a heating device, the combination of a relatively long, electrically heating element, and a perforate food containing-cup overlying a central imperforate tube surrounding a portion of said heating element.

3. In a heating device, the combination of a relatively long, electrically heating element, a perforate food-containing removable cup surrounding a portion thereof, and means carried by said element for supporting said cup.

4. In a heating device, the combination of a relatively long, electrically heating element, a food-containing cup having perforate top and bottom walls surrounding said element, means for supporting said cup and said element in vertical positions.

5. In a heating device, the combination of an open-top liquid-containing vessel, a removable, perforate cover therefor, a relatively long, electrically heating element supported by said cover, a terminal socket secured to the upper end of said element, and a food cup removably supported about said heating element.

6. In a heating device, a heating element, a relatively long, closed tube covering said element, a terminal socket secured to said tube to which said element is electrically connected, a food cup removably supported on said tube, and means carried by said tube to support said cup.

7. In a heating device, the combination of a liquid containing vessel, a relatively long, electric, heat-producing element; a perforate food cup supported about said element and an imperforate spaced apart tube between said cup and element terminating above the top of said cup whereby to cause heated liquid to pass into said cup from said imperforate tube.

In testimony whereof I hereunto set my hand in the presence of two witnesses.

McGERRY ALLMAYER.

In the presence of—
MARY F. ALLEN,
W. LINN ALLEN.